(12) United States Patent
Lai

(10) Patent No.: US 8,418,314 B2
(45) Date of Patent: Apr. 16, 2013

(54) WHEEL ASSEMBLY WITH A WHEEL LOCK STRUCTURE

(76) Inventor: Wei-Hung Lai, Taichung (TW)

(*) Notice: Subject to any disclaimer, the term of this patent is extended or adjusted under 35 U.S.C. 154(b) by 64 days.

(21) Appl. No.: 13/210,549

(22) Filed: Aug. 16, 2011

(65) Prior Publication Data

US 2013/0042436 A1 Feb. 21, 2013

(51) Int. Cl.
 *B60B 33/00* (2006.01)
 *B60T 1/00* (2006.01)

(52) U.S. Cl.
 USPC ............. 16/35 R; 16/18 R; 188/1.12; 188/31

(58) Field of Classification Search ............ 16/45, 35 R, 16/18 R; 5/86.1; 188/1.12, 31; 280/33.994
See application file for complete search history.

(56) References Cited

U.S. PATENT DOCUMENTS

| | | | | |
|---|---|---|---|---|
| 3,376,954 A * | 4/1968 | Neptune | ......................... | 188/69 |
| 3,881,216 A * | 5/1975 | Fontana | ......................... | 16/35 R |
| 4,333,207 A * | 6/1982 | Atwood | ......................... | 16/35 R |
| 4,941,552 A * | 7/1990 | Screen | ......................... | 188/1.12 |
| 5,232,071 A * | 8/1993 | Kawanabe | ................... | 188/1.12 |
| 5,368,133 A * | 11/1994 | Yang | ............................ | 188/1.12 |
| 5,632,360 A * | 5/1997 | Melara | ......................... | 188/1.12 |
| 5,988,323 A * | 11/1999 | Chu | ............................. | 188/1.12 |
| 6,360,851 B1 * | 3/2002 | Yang | ............................ | 188/1.12 |
| 6,532,624 B1 * | 3/2003 | Yang | ............................ | 16/35 R |
| 6,619,438 B1 * | 9/2003 | Yang | ............................ | 188/1.12 |
| 7,331,428 B2 * | 2/2008 | Chiang | ........................ | 188/1.12 |
| 7,367,432 B2 * | 5/2008 | Chen | ............................. | 188/19 |
| 7,516,512 B2 * | 4/2009 | Tsai | .............................. | 16/35 R |
| 7,708,119 B2 * | 5/2010 | Chen | ............................. | 188/19 |
| 7,930,802 B2 * | 4/2011 | Tsai | .............................. | 16/35 R |
| 7,937,805 B2 * | 5/2011 | Tsai | .................................. | 16/47 |
| 7,950,108 B2 * | 5/2011 | Yang et al. | ........................ | 16/47 |
| 8,079,606 B2 * | 12/2011 | Dull et al. | ................... | 280/47.39 |
| 8,117,715 B2 * | 2/2012 | Tsai et al. | ...................... | 16/35 R |
| 2009/0113671 A1 * | 5/2009 | Chu | ................................. | 16/35 R |
| 2010/0077562 A1 * | 4/2010 | Block et al. | ........................ | 16/46 |
| 2011/0119864 A1 * | 5/2011 | Minowa | ............................ | 16/45 |

FOREIGN PATENT DOCUMENTS

JP 07284430 A * 10/1995
JP 09272302 A * 10/1997

* cited by examiner

*Primary Examiner* — Victor Batson
*Assistant Examiner* — Emily Morgan
(74) *Attorney, Agent, or Firm* — Rosenberg, Klein & Lee

(57) ABSTRACT

A wheel assembly includes a base frame having a chamber and a stem in the chamber, a mounting frame for mounting, a wheel pivotally mounted in the base frame, and a wheel lock structure consisting of a holder frame, a lift frame, a crank arm, a control knob and a compression spring and operable to lock/unlock the wheel.

1 Claim, 5 Drawing Sheets

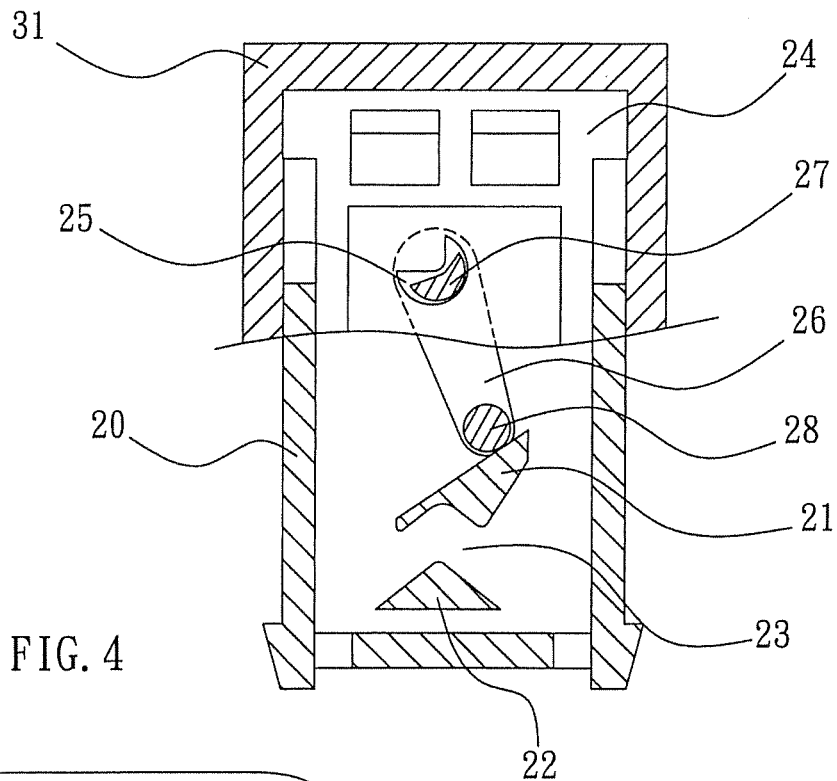
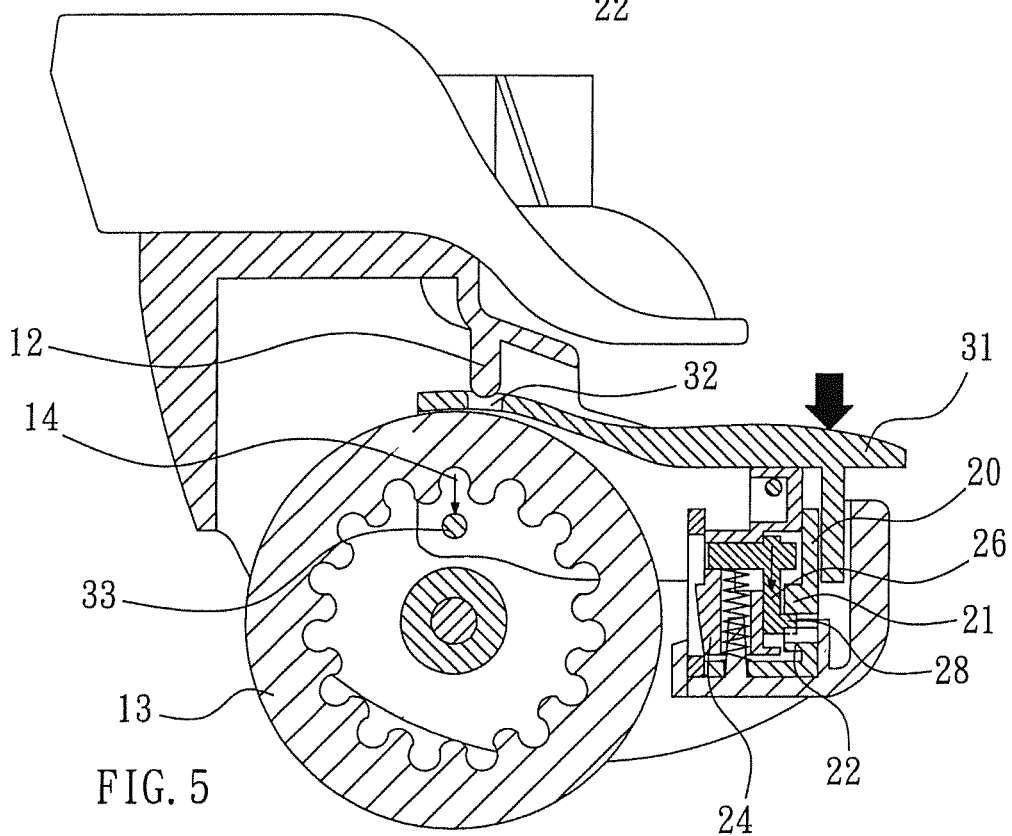

WHEEL ASSEMBLY WITH A WHEEL LOCK STRUCTURE

BACKGROUND OF THE INVENTION

1. Field of the Invention

The present invention relates to wheel technology and more particularly, to a wheel assembly, which is controllable between a locking position and an unlocking position.

2. Description of the Related Art

The wheel (caster) structures of conventional travel bags and chairs do not provide a locking mechanism (brake structure) for locking the wheels (casters). There are wheel (caster) structures operable to lock the wheels (casters). These designs use a lever to move clamping blocks between a locking position and an unlocking position. However, this design has drawbacks as follows: (1) The lever must be operated by hand, i.e., the user must bend the body when operating the lever. (2) The clamping blocks lock the wheel(s) by friction resistance that is less tightness.

SUMMARY OF THE INVENTION

The present invention has been accomplished under the circumstances in view. It is one object of the present invention to provide a wheel assembly, which is controllable between a locking position and an unlocking position.

To achieve this and other objects of the present invention, a wheel assembly includes a base frame having a chamber and a stem in the chamber, a mounting frame for mounting, a wheel pivotally mounted in the base frame, and a wheel lock structure consisting of a holder frame, a lift frame, a crank arm, a control knob and a compression spring. The compression spring imparts an upward pressure to the lift frame and the control knob in supporting the crank arm in a locking position where the locating pin of the crank arm is disengaged from the retaining channel of the holder frame and the lock pins of the control knob are respectively engaged into the respective lock holes of the wheel. The control knob is operable to lower the lift frame and the crank arm, moving the locating pin of the crank arm into the retaining channel of the holder frame and disengaging the lock pins of the control knob from the respective lock holes of the wheel for allowing free rotation of the wheel relative to the base frame.

BRIEF DESCRIPTION OF THE DRAWINGS

FIG. 4 is a schematic sectional side view of the present invention, illustrating the wheel lock structure in the locking position.

FIG. 5 is a schematic sectional front view of the present invention, illustrating the wheel lock structure in the unlocked position.

DETAILED DESCRIPTION OF THE PREFERRED EMBODIMENT

Figure 1:
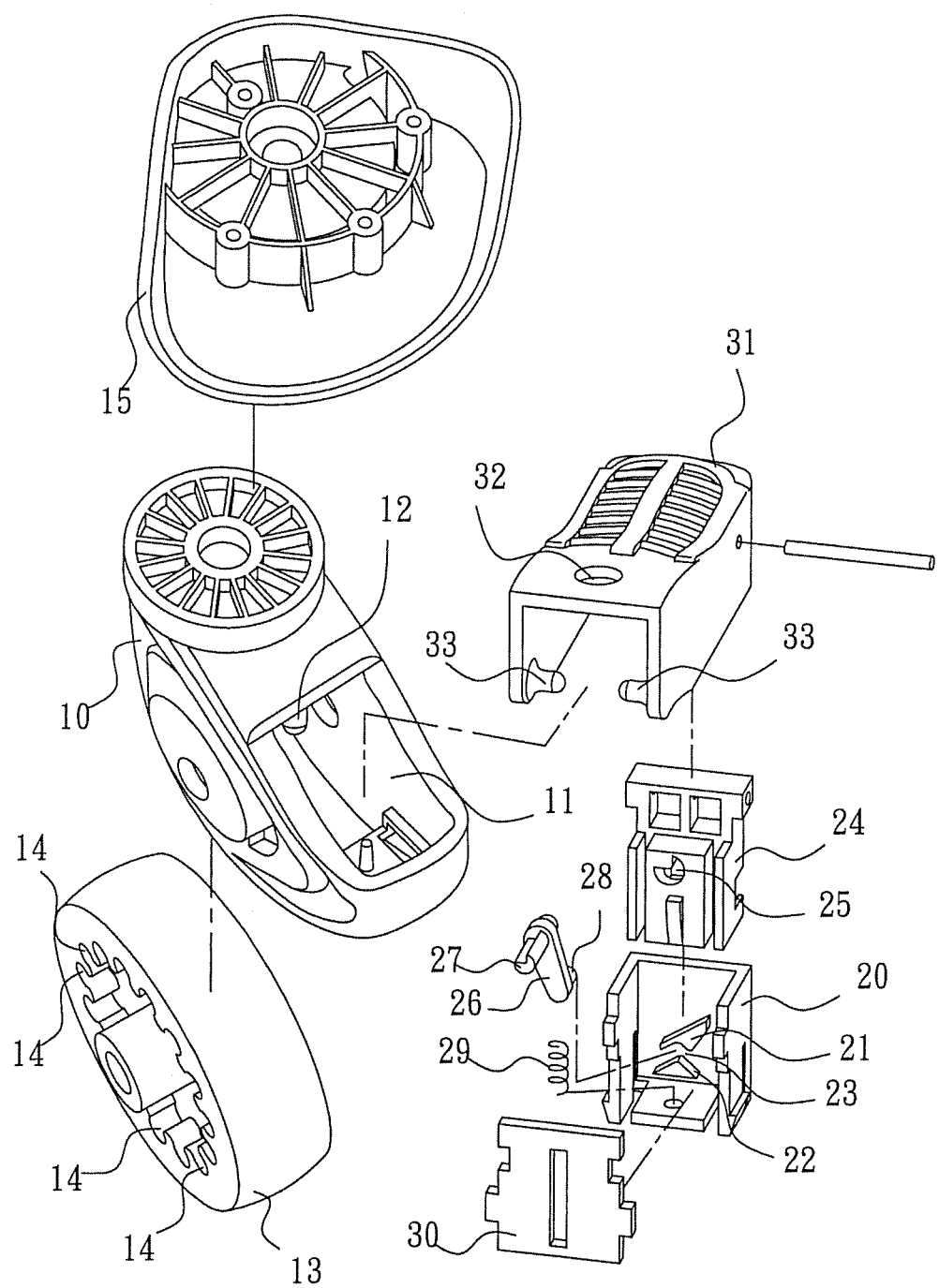
FIG. 1 is an exploded view of a wheel assembly in accordance with the present invention.
Figure 2:
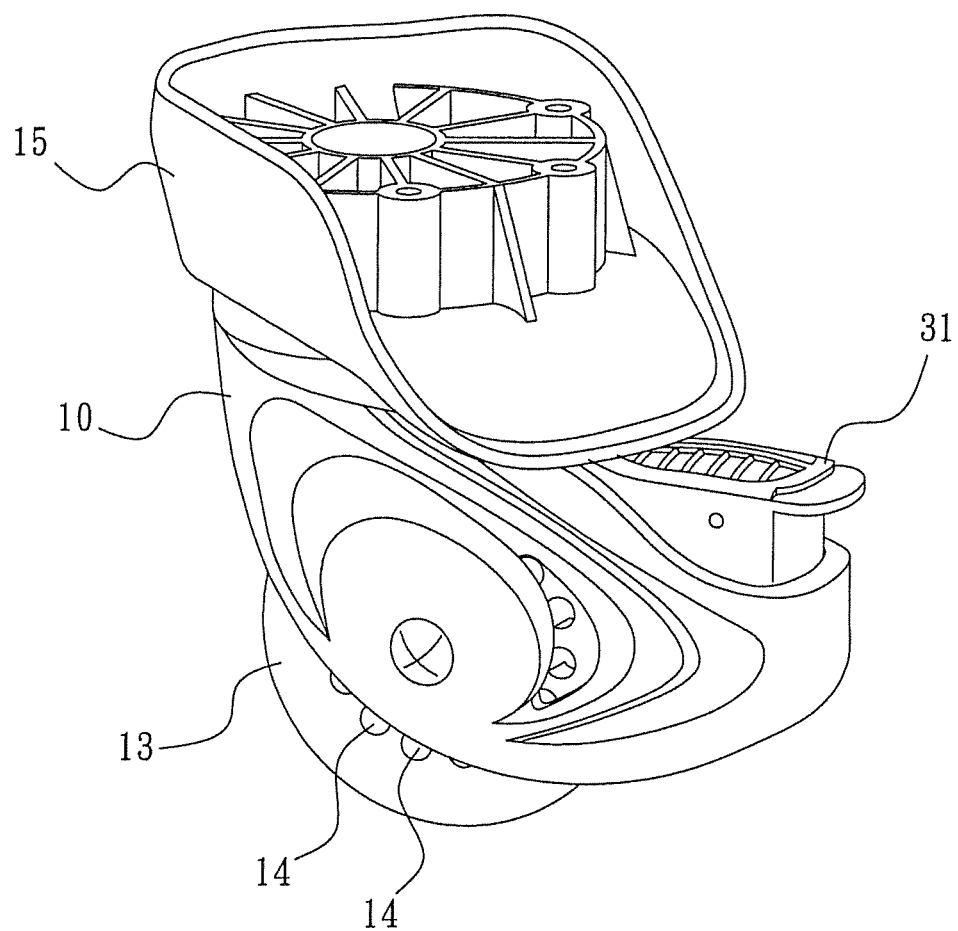
FIG. 2 is an elevational assembly view of the wheel assembly in accordance with the present invention.

Referring to FIGS. 1-7, a wheel assembly in accordance with the present invention is shown comprising a base frame 10 having a chamber 11 defined therein and a stem 12 downwardly suspending in the chamber 11 at a top side, a mounting frame 15 located on the top side of the base frame 10, a wheel 13 pivotally mounted in the base frame 10 and partially protruding over the bottom open side of the chamber 11, and a wheel lock structure mounted in the chamber 11 for locking the wheel 13. The wheel lock structure comprises a control knob 31, a holder frame 20, a lift frame 24, a crank arm 26, a compression spring 29, and a cap 30.

The holder frame 20 comprises two rail blocks 21;22 and a retaining channel 23 defined between the rail blocks 21;22. The lift frame 24 is arranged in the holder frame 20, comprising an axle hole 25. The crank arm 26 has an axle 27 located on one end thereof and coupled to the axle hole 25 of the lift frame 24, and a locating pin 28 located on the other end thereof. The compression spring 29 is supported between the axle 27 and the bottom wall of the holder frame 20. The control knob 31 is mounted in the lift frame 24, comprising two lock pins 33 and an axle hole 32. The axle hole 32 of the control knob 31 is coupled to the stem 12 of the base frame 10.

The operation of the wheel assembly is outlined hereinafter.

Figure 3:
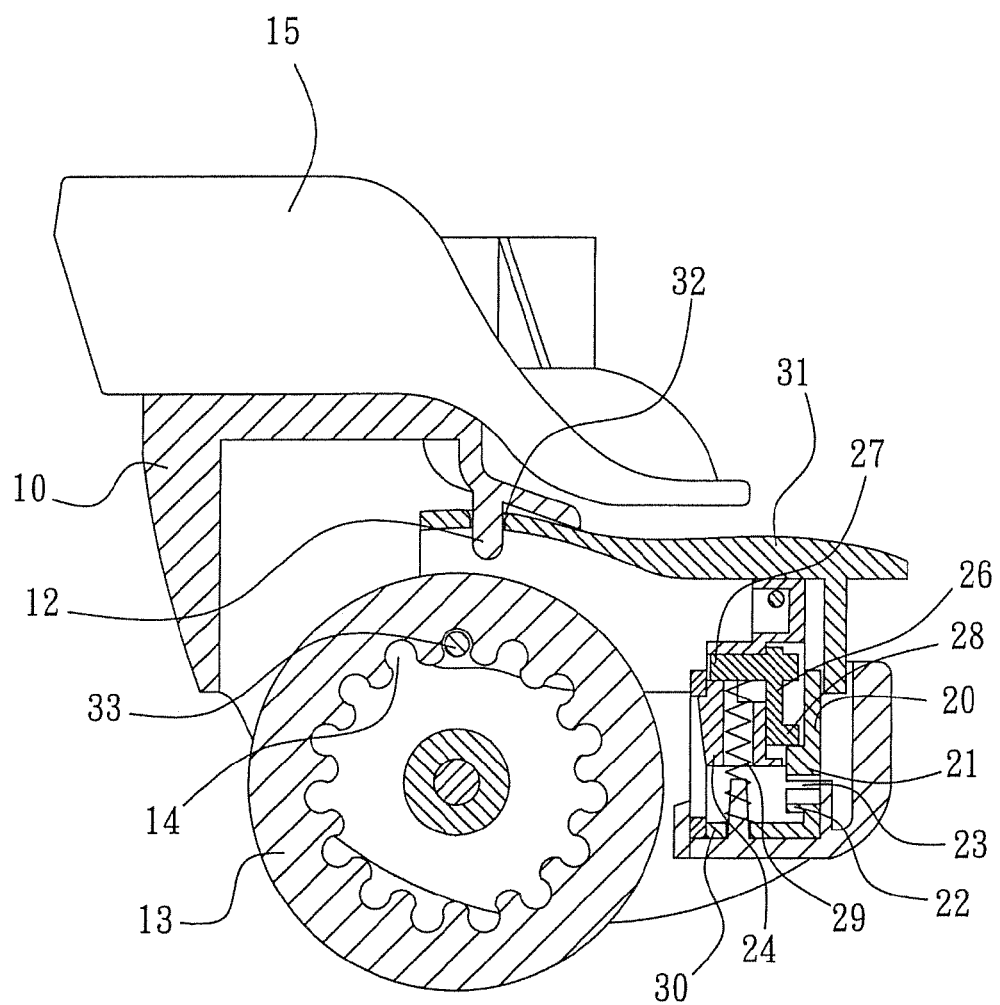
FIG. 3 is a sectional view of the present invention, illustrating the wheel locked.

As shown in FIGS. 3 and 4, the spring force of the compression spring 29 forces the lift frame 24 and the control knob 31 upwards, supporting the crank arm 26 in the upper limit position where the locating pin 28 is disengaged from the retaining channel 23 of the holder frame 20. At this time, the lock pins 33 of the control knob 31 are respectively engaged into respective lock holes 14 of the wheel 13, and therefore the wheel 13 is locked.

Figure 6:
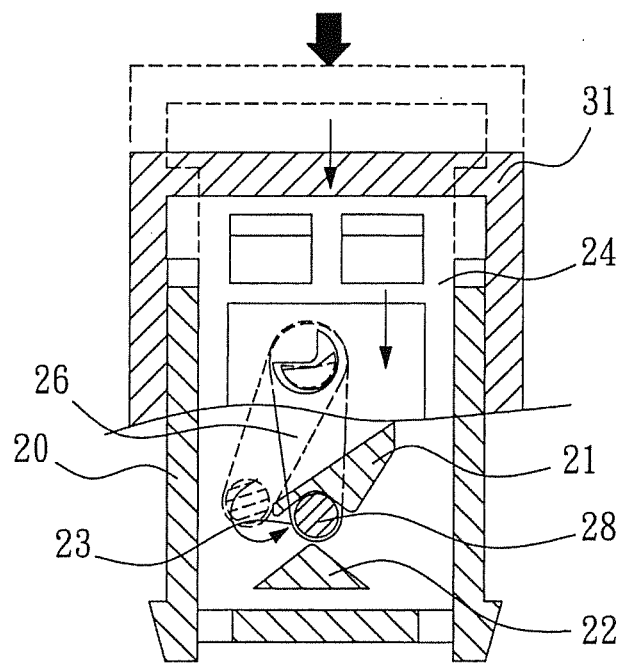
FIG. 6 is a schematic sectional side view of the present invention, illustrating the wheel lock structure in the unlocked position.

When going to unlock the wheel 13, as shown in FIGS. 5 and 6, press down the control knob 31 by hand (or step down the control knob 31 by foot) to lower the lift frame 24 and the crank arm 26, moving the locating pin 28 into the retaining channel 23 of the holder frame 20, and at the same time, the lock pins 33 of the control knob 31 are respectively disengaged from the respective lock holes 14 of the wheel 13, and therefore the wheel 13 is unlocked.

Figure 7:
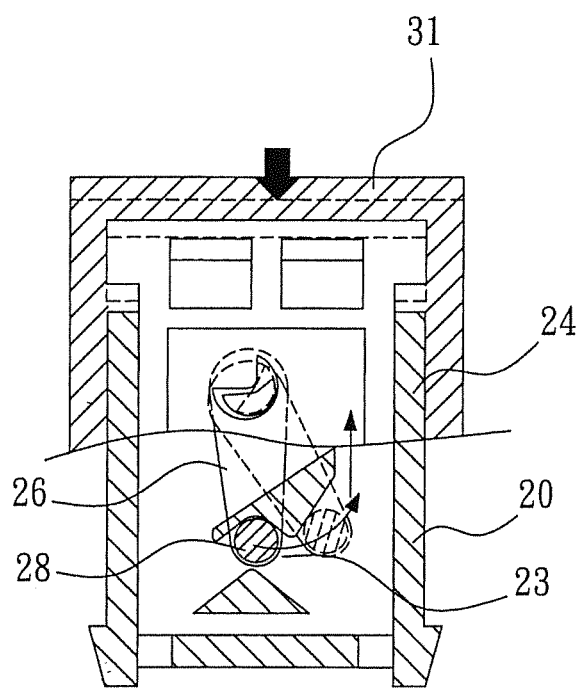
FIG. 7 is a schematic sectional side view of the present invention, illustrating the action of the wheel lock structure from the unlocked position to the locking position.

When wishing to lock the wheel 13 again, as shown in FIG. 7, press the control knob 31 to lower the lift frame 24 and the crank arm 26 slightly and to further disengage the locating pin 28 from the retaining channel 23 of the holder frame 20, allowing the lift frame 24 to be returned by the spring force of the compression spring 29 to the former position shown in FIGS. 3 and 4 where the lock pins 33 of the control knob 31 are respectively engaged from the respective lock holes 14 of the wheel 13 to lock the wheel 13.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wheel assembly, comprising:
   a base frame comprising a chamber and a stem downwardly suspending from a top side of said chamber;
   a mounting frame located atop said base frame, a wheel pivotally mounted in said base frame and partially protruding from a bottom open side of said chamber; and
   a wheel lock structure mounted in said chamber operable to lock and unlock said wheel;

wherein said wheel lock structure comprises:
- a holder frame comprising two rail blocks and a retaining channel defined between said rail blocks;
- a lift frame arranged in said holder frame, said lift frame comprising an axle hole;
- a crank arm, said crank arm comprising an axle located on one end thereof and coupled to the axle hole of said lift frame and a locating pin located on an opposite end thereof;
- a control knob mounted in said lift frame, said control knob comprising two lock pins selectively engaging respective lock holes on said wheel to lock said wheel to said base frame and an axle hole selectively coupled to the stem of said base
- a compression spring supported between the axle of said crank arm and a bottom wall of said holder frame to impart an upward pressure to said lift frame and said control knob in supporting said crank arm in a locking position where the locating pin of said crank arm is disengaged from the retaining channel of said holder frame and the lock pins of said control knob are respectively engaged into the respective lock holes of said wheel; said control knob is operable to lower said lift frame and said crank arm, moving the locating pin of said crank arm into the retaining channel of said holder frame and disengaging the lock pins of said control knob from the respective lock holes of said wheel for allowing free rotation of said wheel relative to said base frame.

* * * * *